Dec. 14, 1965    G. GERARD ET AL    3,223,003
SEALING MEANS RESPONSIVE TO FLUID PRESSURE TO PROVIDE
RADIAL AND AXIAL SEALING EFFECTS
Original Filed July 28, 1961    2 Sheets-Sheet 1

INVENTORS:
GEORGE GERARD
JACOB BRAYMAN
BY
Brumbaugh, Free,
Graves & Donohue
THEIR ATTORNEYS INVENTORS:
GEORGE GERARD
JACOB BRAYMAN
BY
Brumbaugh, Free,
Graves & Donohue
THEIR ATTORNEYS United States Patent Office 3,223,003
Patented Dec. 14, 1965

3,223,003
SEALING MEANS RESPONSIVE TO FLUID PRESSURE TO PROVIDE RADIAL AND AXIAL SEALING EFFECTS
George Gerard, Yonkers, and Jacob Brayman, Staten Island, N.Y., assignors to Barogenics, Inc., a corporation of New York
Original application July 28, 1961, Ser. No. 127,738, now Patent No. 3,156,475, dated Nov. 10, 1964. Divided and this application Nov. 3, 1964, Ser. No. 413,677
5 Claims. (Cl. 92—182)

This application is a division of application Serial No. 127,738 filed July 28, 1961 (corresponding to U.S. Patent 3,156,475 issuing November 10, 1964), invention of this application relating to compensating seals and more particularly, to novel sealing structures designed for use as static and dynamic seals.

A problem encountered frequently with enclosed chambers where large internal pressures are generated involves the failure of seals which are necessary in order to maintain the pressure within the system and prevent leakage of the fluid or gas or other media contained in the chamber. This failure, in many instances, is caused by extrusion of the seal into a gap formed between the contacting surfaces when the pressure builds up in the system. For example, it has been found that, in piston-cylinder arrangements, there is a tendency for the sealing material to be extruded through the clearance space between the piston and the bore of the cylinder as a result of the pressure exerted by the pressurized medium on the sealing ring when that space becomes enlarged because of radial expansion of the cylinder (relative to the piston) induced by the pressure of the medium.

Also, in those types of pressure containers in which pressure-tight joints are required to be formed by the bolting together of separate flanged sections thereof, it has been found that, under the application of internal pressure within the container, the sealing means at the joint are unsatisfactory even where flange bolts of large cross-sectional area are utilized.

The problem of seal failure is a serious one, whether the pressure system involves the use of static or dynamic seals. In this connection, the phrase "static seal" is used herein with reference to a sealing arrangement in which there is no relative motion (other than that due to deformation) between the sealing element and the surface contacted thereby to form the seal. The phrase "dynamic seal" is used in a contrasting manner to refer to a system where such relative motion exits.

Conventional static and dynamic seals (including rubber and steel O rings, V rings, C rings, "Delta" rings, fiber packing wound spiral gaskets, etc.) have all been characterized by undesirably frequent failures when employed in pressure systems such as piston-cylinder arrangements as well as other types of pressurized systems. Attempts to alleviate the situation have involved the use of expandable seals and back-up rings. However, those expedients have not been satisfactory, particularly in high pressure work, and the art is still burdened with the difficulty imposed by seal failures.

A principal object of this invention is to provide a seal combination effective for use in preventing leakage of gas or fluids or other media from pressure apparatus.

Another object is to provide static and dynamic sealing means suitable for use in pressure systems and which do not extrude into the space generated between mating surfaces by application of internal pressure thereon.

Still another object of the invention is to provide a flange or like joint effective in preventing the pressure media from escaping, while eliminating the need for large-size bolts and flange surfaces at the joint.

These and other objects and advantages of this invention will be apparent from a consideration of the following specification read in connection with the accompanying drawings wherein.

Figure 4:
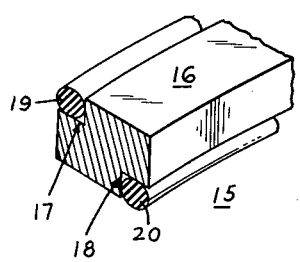
FIG. 4 is an isometric view of the seal assembly used in the structure of FIGS. 1 and 2.

In the illustrative form of the invention which is shown in FIGS. 1–4 inclusive, an improved dynamic seal assembly is depicted as being applied to seal the clearance space existing between a reciprocating piston 10 and a stationary cylinder 11. A cover plate 12 (FIG. 1) is attached to the body of the piston 10 by suitable means such as grommets or screws 13. A concentric groove 14 is machined into the piston in a direction perpendicular to the walls of the cylinder 11 for the purpose of receiving the annular seal assembly. The seal assembly 15 is shown in FIG. 4 and comprises an elastic, metallic annular seal carrier 16 preferably made from steel and having a pair of circumferential grooves formed in its body of rectangular cross section. One groove, indicated at 17, extends inwardly from the outside diameter of the carrier at the upper side thereof, while the other groove, indicated at 18, is diagonally located in relation to 17 and extends outwardly from the inner periphery of the carrier at the lower side thereof. Within these grooves 17 and 18 are carried conventional seal rings 19 and 20, respectively. Such rings may be formed of, say neoprene or (for higher pressure work) of steel tubing.

Figure 1:
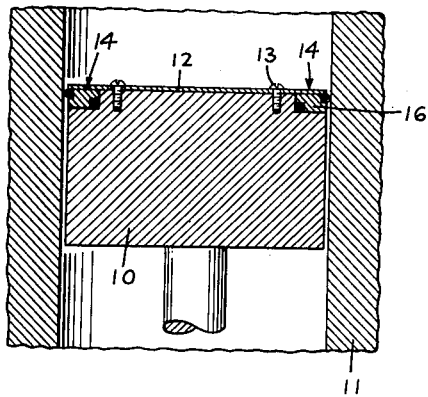
FIG. 1 represents a sectional view of a cylinder and piston arrangement incorporating a dynamic sealing assembly according to the invention.
Figure 2:
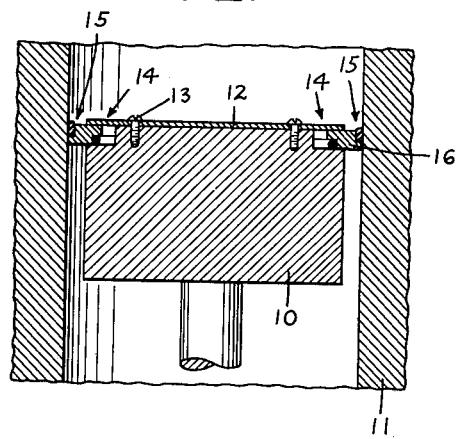
FIG. 2 is a view of the structure of FIG. 1 under an internal pressure generated in the system.
Figure 3:
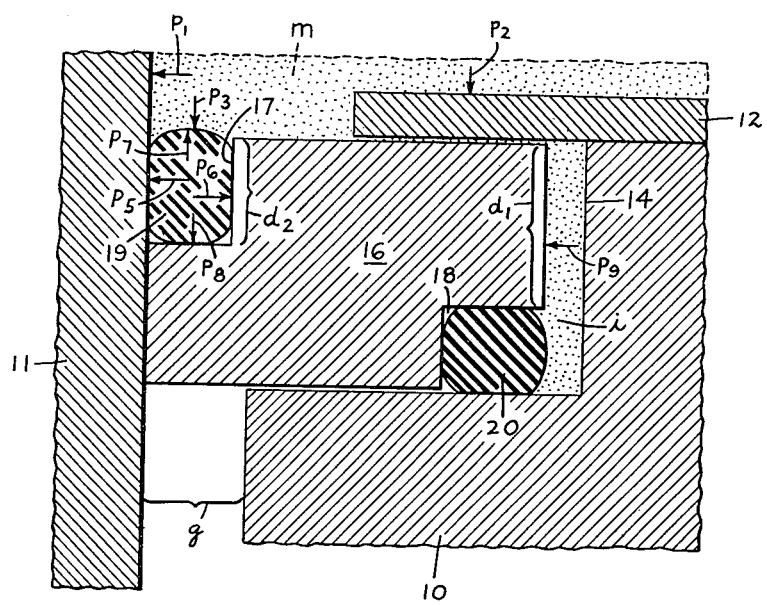
FIG. 3 is a view of a portion of FIG. 2 which has been enlarged to better explain the operation of the FIG. 1 dynamic seal.

Referring now to FIGURES 2 and 3, in operation the piston 10 is driven downwardly within cylinder 11 by a pressurized medium $m$ (represented by stippling in FIG. 3) disposed within the cylinder above the piston. The medium $m$ exerts a horizontal pressure $p_1$ on the interior wall of cylinder 11, a downwardly directed actuating pressure $p_2$ on the piston assembly excluding ring 19, and a downwardly directed pressure $p_3$ on such ring itself.

First considering the effect of $p_1$ and $p_2$, the pressure $p_2$ compressively deforms the piston 10 to produce a slight radial expansion thereof. The pressure $p_1$, however, produces a much greater radial expansion of the cylinder 11. Hence, the net effect of $p_1$ and $p_2$ is to form a gap $g$ between elements 10 and 11 by enlarging the normal clearance space between those elements.

Next considering the effect of $p_3$ on ring 19, such applied pressure develops within the ring a hydrostatic pressure which acts in all directions, i.e., leftwardly and rightwardly as represented by, respectively, the arrows $p_5$ and $p_6$, and up and down as represented by, respectively, the arrows $p_7$ and $p_8$. If, as is conventional, the ring 19 were merely to be carried in a groove in the piston 10 (or in the cylinder), the pressure $p_8$ would not be opposed by any pressure in the gap. Accordingly, the pressure $p_3$ applied to the ring from medium $m$ and transformed into pressure $p_8$ would tend to produce an extrusion into gap $g$ of the ring material. While total extrusion (i.e., failure of the ring) would be prevented for a period of time by the elasticity of the ring material, nonetheless, such material, being imperfectly elastic, would, when subjected to pressure, undergo a creeping inelastic deformation so that, eventually, the ring would fail by being squeezed into the gap. Note that the failure of such a conventional ring arrangement is hastened by (and, in fact, is usually primarily caused by) the increased extrusion force to which the ring is subjected as a result of the radial expansion of the cylinder relative to the piston and the consequent enlargement of the clearance space therebetween.

As opposed to the above-described sequence of events which lead to failure of a conventional sealing arrangement, in the sealing assembly of FIGS. 1–4, some of the pressurized medium $m$ passes between the cover plate 12 and the top of seal carrier 16 into the interspace $i$ between the inside face of the groove 14 and the inner face of the seal carrier. Within this interspace, the medium $m$ exerts on the inner face of the seal carrier a pressure $p_9$ directed radially outwards. While the pressure $p_9$ is substantially equal to the pressure $p_6$ developed by medium $m$ in ring 19 and acting from that ring radially inwards on the seal carrier, $p_9$ acts over a vertical extent $d_1$ of the seal carrier's inner face which is sufficiently greater than the vertical extent $d_2$ over which $p_6$ acts over the carrier's outer face so that, even taking into account that the outer face is at a greater radius than the inner face from the piston axis, the pressure $p_9$ acts over a substantially greater face area of carrier 16 than the pressure $p_6$. It follows that the net force acting in the horizontal direction on the seal carrier 16 will be a force directed radially outwardly against the inner face of the seal carrier.

The seal carrier 16 responds to such net radial outward force to undergo a radial expansion. By appropriate design of the carrier, such expansion is rendered at least as great as the radial expansion of the cylinder wall. Preferably, the carrier is so designed that the radial expansion thereof exceeds that of the cylinder to thereby reduce the clearance space between the outside face of carrier 16 and the cylinder wall as the pressure of the medium $m$ increases. In fact, we have found that best results are obtained when the carrier 16 is so designed that normal operating pressure produces a radial expansion thereof sufficient to bring the outside of carrier 16 into contact with the cylinder wall to be restrained by that wall from further radial expansion. While it might be thought that such forcible contact between the cylinder wall and the seal carrier ring would produce binding we have discovered that with a suitably designed ring (which avoids development of excessive cylinder-ring contact pressure), such binding does not take place and that a very superior seal results.

When the seal carrier 16 radially expands as described, there is no opening up of a clearance space adjacent the ring 19, and accordingly, there is avoided the prior art problem of the tendency of the ring to extrude into such space when the same becomes enlarged under operating conditions. When, as is preferable, the radial expansion of seal carrier 16 is greater than that of the cylinder, as the operating pressure progressively increases, the pressure seal provided by ring 19 actually becomes progressively tighter. In the limiting case where the radial expansion of the carrier brings it into contact with the cylinder wall at normal operating pressure, no gap at all exists through which the material of the ring 19 can extrude, and, accordingly, the seal cannot fail as a result of being extruded into such a gap.

The improved operation of the seal of FIGS. 1–4 is dependent upon two factors of which the first is, as described, the entry of the pressurized medium $m$ into the interspace $i$ to exert an outward radial pressure on the inner face of seal carrier 16. The second factor is that the area of the carrier 16 against which such radial outward pressure is exerted must be greater than the area of carrier 16 against which is exerted the inwardly directed radial pressure applied to the carrier from the sealing ring 19 as a result of the pressure developed in that ring by the action of the pressurized medium $m$. As an example of the importance of such second factor, obviously the sealing assembly of FIGS. 1–4 would not operate in the manner contemplated if the ring 19 and the groove 17 of carrier 16 which accommodates that ring were of sufficient size that the area acted upon by the pressure $p_6$ developed within ring 19 were to be equal to or greater than the area of carrier 16 acted upon the radial outward pressure $p_9$.

Besides the tight seal provided by ring 19, for the described sealing assembly to be effective as a pressure seal, it must prevent leakage of the pressurized medium $m$ from the interspace $i$ beneath the bottom of the carrier 16 and into the gap $g$. That function is performed by the sealing assembly in a manner as follows.

The pressurizzed medium $m$ exerts on the seal carrier 16 a downwardly directed force equal to the pressure of $m$ multiplied by the area of the entire top surface (including ring 19) of the seal carrier. As opposed to this downwardly directed force, the sealing ring 20 exerts on the seal carrier an upwardly directed force ensuing from the development in ring 20 of a hydrostatic pressure similar to that generated in ring 19 and produced in ring 20 by application to that ring of pressure from the medium $m$ in interspace $i$. Also, before a perfect seal has been made, it may be premised that an additional upwardly directed force is exerted on carrier 16 as a consequence of some initial leakage of the medium $m$ past ring 20 into the interstitial space between the bottom of carrier 16 and the mating surface of groove 14. The medium $m$ when in that interstitial space applies upward pressure to the portion of the bottom of carrier 16 which bound such space.

Now, assuming that the upward pressure exerted on carrier 16 by the ring 20 and by the medium $m$ in the mentioned interstitial space are equal in value to the downward pressure exerted on the top of the carrier, nonetheless, the area of carrier 16 over which such upward pressure is exerted is evidently (FIG. 3) substantially less (there being negligible pressure in gap $g$) than the area over which the equal value downward pressure acts on the carrier. Accordingly, the net vertical force on carrier 16 is a downwardly directed force which squeezes the sealing ring 20 between the upper surface of groove 18 and the horizontally extending lower surface of groove 14. Because the ring 20 is so squeezed between the upper and lower surfaces with which it makes contact, the ring 20 provides a tight pressure seal precluding any steady leakage past the ring of the medium $m$ in interspace $i$. Moreover, because the net downward force on carrier 16 maintains the bottom face thereof in pressure contact with the mating surface of groove 14, there is no gap through which the material of ring 20 can extrude to cause failure of the ring. Regarding such pressure contact, the force with which the bottom of carrier 16 bears against its substrate surface increases as the pressure of medium $m$ increases, first, because (apart from any radial expansion of 16) the net downward force on the carrier 16 varies directly with such pressure, and, second, because the radial expansion (with increasing pressure) of carrier 16 diminishes the downward-facing area thereof which is contained within groove 14, and which is the only area of the carrier possibly subject to upward pressure from the medium. Thus, the described sealing assembly has a self-tightening characteristic insofar as leakage of the medium $m$ past ring 20 is concerned.

It is to be noted that the sealing effect provided by the seal assembly 15 is not impared even though the piston 10 is or becomes somewhat eccentric in relation to the inner cylinderical wall of the cylinder 11.

Figure 5:
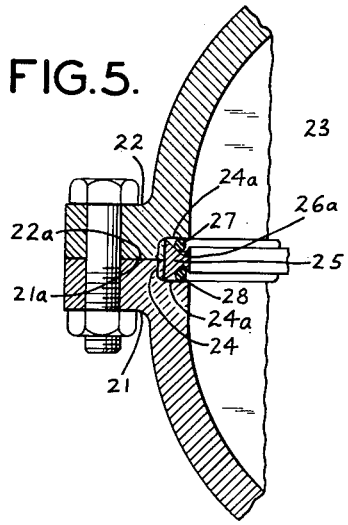
FIG. 5 is a sectional view of a portion of pressure containing system showing a static type of seal assembly according to the present invention.
Figure 6:
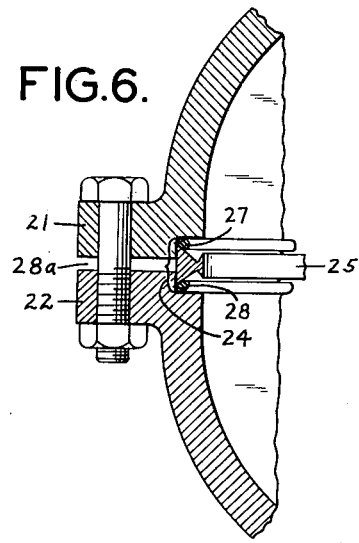
FIG. 6 is a view of the structure of FIG. 5 under operating pressure.

A static seal assembly is shown in FIGS. 5 and 6.

In this assembly, the flanges 21 and 22 of a pressure vessel 23 have abutted mating surfaces 21a, 22a and have machined into their inner peripheries a pair of notches 24a. When the flanges are together, those notches form a single annular groove 24. The groove 24 carries an annular seal carrier 25 having an outer rim and a web portion 26 formed by an inwardly diminishing taper of such carrier from such outer rim. Thus, the cross-section of carrier 25 is generally T-shaped. As shown, the outside surface of the rim of carrier 25 is positioned against the back surface of the groove 24. The horizontal center plane of the T-shaped carrier is shown in FIG. 5 as registering with the plane of the interface of the flange surfaces 21a, 22a. Such registration is not, however, strictly necessary so long as the base or rim of the carrier covers the mentioned interface. Thus, for example, the center plane of the carrier and the plane of the interface of the flange surfaces 21a, 22a may be out of registration in the instance where the groove 24 is formed by notches 24a of unequal vertical extent so that the interface plane is not at the vertical center point of the groove 24.

In the space between the web portion 26 of the seal carrier and the upper and lower surfaces of the groove 24, are placed suitable seals 27 and 28 such as rubber or steel O rings, V rings, square rings, or some other type of annular seal. A small tip 26a is machined on the inner end of the web portion 26 to retain the seals in position. Alternatively, a retainer such as a snap ring can be used for this purpose.

With reference to FIG. 6, it is seen that as internal pressure is applied to the seal assembly, the pressure expands the seal rings 27 and 28 radially outwardly. When, however, the seal rings are so expanded, they are forced into regions of steadily decreasing volume, such regions being formed by the tapered surfaces of the seal carrier 25 and the upper and lower surfaces of the groove 24. The degree to which the volume of those regions is decreased with radial distance outward can be adjusted by varying the slope of the tapered surfaces of the web portion 26 of the seal carrier 25.

To state in another way the effect of pressure on rings 27, 28, when those rings radially expand under the pressure applied thereto, each ring is wedged by the contacting slanting tapered surface of carrier 25a against the surface of the groove 24 with which the ring makes contact. Therefore, as the pressure progressively increases, each ring is squeezed progressively harder between the carrier and groove surfaces with which such ring makes contact to thereby provide a tighter and tighter pressure seal.

As the internal pressure increases, the flange surfaces 21a and 22a tend to separate to provide an opening 28a therebetween (FIG. 6) and to rotate (in a plane containing the axis of the joint) with respect to one another. However, neither seal ring moves into that opening because each seal ring is separated from such opening by the outer rim or base of the seal carrier. Although the opening between the flange surfaces may be substantial, the seal carrier, being a material such as steel and having its maximum thickness at its outer rim, easily resists failure due to extrusion through the opening.

While, of course, the opening up of the flanges produces a separation (which increases with pressure) of the upper and lower surfaces of groove 24, the tapered surfaces of the web portion of carrier 25 are designed to have a slope which produces a net wedging effect on the rings 27, 28 despite such separation of the mentioned groove surfaces.

A conventional flange joint sealing assembly differs from that shown in FIGS. 5 and 6 in that the sealing ring is placed directly between the mating flange surfaces of the joint. Such conventional arrangement has a number of disadvantages, as follows. First, as is true of any flange joint, the separate halves thereof will be subjected under pressure to end loading which tends to pull the two halves apart. Also any misalignment of the two halves as bolted together causes the end load to have the further effect of tending to produce a rotation of one-half of the joint relative to the other in a plane containing the joint axis. Thus, a flange joint is ordinarily subjected under pressure both to axial and to angular deflection.

Now, when as is conventional, the sealing ring or the like is disposed between the mating flange surfaces, the seal provided by such rings tends to rapidly open up in the presence of any substantial amount of either axial or angular deflection of the joint. Accordingly, it has been necessary in the past to fasten the separate flanged halves of the joint by bolts or the like which are pre-loaded to place the flanges and the sealing ring under a negative deflection compensating up to a certain point for the positive axial and/or angular deflection produced in the joint under normal operating conditions. Despite, however, the reduction of positive deflection provided by such pre-loading, some types of rings or like sealing devices are so sensitive to deflection that they are capable of sealing only for relatively low pressure conditions, while even the more deflection-resistant seals are effective to only slightly higher pressures. Moreover, the use of pre-loading has the disadvantage that, in order to obtain the required amount of pre-loading, it is necessary that the bolts be of relatively large cross section in order to resist both the pre-loading and, also, the end loading on the joint. Further, the flanges must be of sufficient size to accept such large size bolts.

Still another disadvantage inherent in the conventional flanged joint assembly (wherein the flanges are fastened togeher by bolts) is that, when the flanged halves of the joint rotate in a plane containing the joint axis, the outer diameter of the flanges acts as a fulcrum and corresponding increases the load on the bolts. The additional bolt loading caused by such position of the fulcrum has been known in the past to have caused failure of the bolts of the joint and, therefore, of the joint itself.

Figure 7:
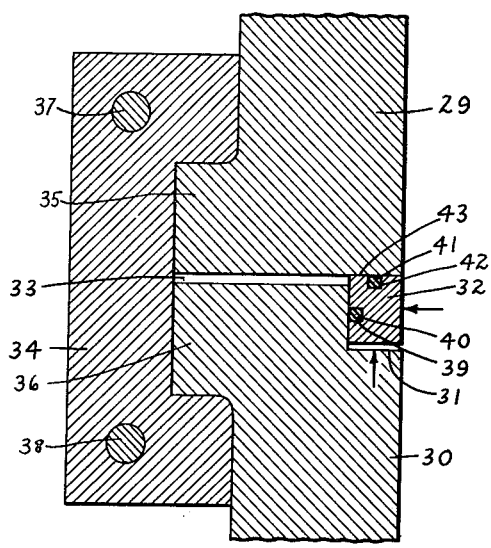
FIG. 7 is a view of a flange joint illustrating another static type of seal, according to the present invention.

There will now be described a modification of this invention (as applied to static seals) which overcomes all the above-discussed disadvantages of bolt-fastened, flange joint assemblies. Referring to FIG. 7, in that figure there is shown an assembly of upper and lower flanges 29 and 30 representing end terminations of separate sections of, say, a pressure containing vessel. Machined on the inside corner of the lower flange 30 of the assembly is a circumferential annular groove 31 within which is positioned the seal carrier assembly 32 which is rectangular in cross-section. The outer diameter of the seal carrier fits snugly against the outer periphery of the groove 31 in the lower flange 30, the inside diameter of the seal carrier being flush with the inside surface of the lower flange. The vertical height of the seal carrier is greater than the depth of the groove 31, and a gap 33 is thereby formed between the contacting faces of the upper and lower flanges.

As shown in FIG. 7, in the preferred method of joinder of flanges 29 and 30, the separate halves of a split clamp (of which one-half 34 is shown) each grip both of two lugs 35, 36 formed on the outside of, respectively, the flanges 29 and 30. Those two clamp halves may be fastened together by means of top and bottom bolts 37 and 38 at each of the two diametrally opposite places where the two halves abut. Alternatively, a solid ring may be placed around the split clamp to hold the two halves together.

In lieu of the split clamp, the flanges may be fastened by axial bolts, pre-torquing of the bolts being unnecessary. As still another alternative, swing bolts or keys may be used as a fastening means for the flange assembly. Thus, various types of flanges fastening means may be used in combination with the flange sealing means of FIG. 7.

Positioned within a circumferential groove 39 machined along the outer diameter of the annular seal carrier 32 is a conventional seal 40 such as a steel or rubber O ring, crescent seal, delta seal, etc. A similar ring 41 is carried within an annular groove 42 on the upper horizontal surface 43 of the seal carrier 32.

When internal pressures are generated at the flange joint, the seal carrier 32, by virtue of the forces applied thereto, is forced outward against the radially outward surface of flange groove 31 and, also, upward against the horizontal surface of the upper flange. The applied forces on the seal carrier are due to the presence of unbalanced pressures arising from the following conditions.

The entire surface of the inner diameter of the seal carrier is exposed to the generated pressure while only that portion of the surface of the outside diameter which is below the seal member 40 is so exposed. Furthermore, the seal carrier 32 is also being forced upward by the pressure applied to its horizontal lower surface. Because the seal 41 is placed within the median vertical plane of the seal carrier 32, the downward force being applied to the seal carrier is less than the upward force so that the net force on the carrier body urges it upwardly. Considering the seal rings 40 and 41 of the FIG. 7 embodiment as analogous to, respectively, the seal rings 20 and 19 of the embodiment of FIGS. 1–4, the operation of the FIG. 7 embodiment can be explained in terms of substantially the same principles as those governing the heretofore described operation of the earlier discussed embodiment.

In connection with the FIG. 7 embodiment as the pressure increases, the possibility of seal failure does not increase since there are no openings adjacent the rings 40 and 41 through which such rings can extrude. Higher pressures in the system only serve to force the seals tighter against their contacting surfaces. Because the gap 33 initially separated the flange surfaces, relative rotation of the flanges under pressure (in a plane containing the axis of the flange joint) does not influence seal effectiveness since the fulcrum point is at the outer periphery of the seal carrier rather than the outside diameter of the flange as is the case with conventional flange assemblies and, hence, the relative rotation of the flanges does not appreciably "open up" the seal. The sealing member carried in the outer diameter of the seal carrier, although placed quite close to this fulcrum point, is unaffected by rotation of the flange surfaces.

An important advantage of this novel flange assembly is that conventional sealing elements can be utilized in the seal carrier without the necessity of perfecting special seals for a particular system. Thus, where the temperature is not too high, conventional Neoprene O rings are most satisfactory. Under conditions involving elevated temperatures, steel O rings are usually required. The same seal carrier ring may be used with any type of seal.

It will occur to those skilled in the art that there are many modifications to the invention as specifically described herein. Thus, for example, in the FIG. 1 embodiment the groove 17 for ring 19 may be moved to a position part way down the axial extent of carrier 16 (the groove 17 then having a U-shaped cross-section) or the groove 18 for ring 20 may be moved to a position intermediate the inner and outer peripheries of carrier 16 (groove 18 then having a U-shaped cross-section) or both of grooves 17 and 18 can be changed as just described. Likewise, in the FIG. 7 embodiment the groove 39 may be moved to the lower left hand corner of the carrier 32 (and be made of L-shaped cross-section) or the groove 42 may be moved to the upper right hand corner of carrier 32 (and be made of L-shaped cross-section) or both of grooves 39 and 42 can be changed as described. Thus, the position of the two grooves formed in the carriers of FIG. 1 or of FIG. 7 are not critical so long as the sealing rings received thereby are appropriately disposed to provide pressure sealing in the manner hitherto discussed. Neither the carrier 16 nor the carrier 32 need be of rectangular cross-section but may be of more or less rounded cross-section, the grooves in which they are received being correspondingly shaped to provide a proper seat for the carriers. While, in connection with the FIG. 7 embodiment it is preferred that the flanged members 29 and 30 be spaced apart as shown, if desired those members can be rendered abutting, the carrier 32 being correspondingly shortened in axial extent so as not to project axially beyond member 30 when the carrier is in groove 31.

Accordingly, it is intended to include all such modifications within the scope of the appended claims.

We claim:

1. Apparatus comprising, first and second fluid enclosure means of which one surrounds the other, and both are disposed axially and radially of a central axis to jointly enclose at least part of a region occupiable by pressurized fluid; there being between said two means an annular zone which has an entrance to an axial end of said region and is a zone of potential leakage of fluid from said region; and said second means providing next to said entrance a surface presented towards said region and extending radially towards said zone entrance and first means; a closed annular resilient carrier ring disposed next to said surface to be axially between it and a portion of said region and to be radially between said first means and a portion of said region; said carrier ring having first and second surfaces which are disposed on radial and axial sides, respectively, of said carrier ring, and which register with, respectively, an axially extending surface of revolution on said first means and said radial surface on said second means; a first closed annular resilient seal ring disposed on the same radical side of said carrier ring as said first surface to have said first surface interposed between said first seal ring and said zone entrance; and a second closed annular resilient seal ring disposed on the same axial side of said carrier ring as said second surface to have said surface interposed between said second seal ring and said zone entrance; said carrier ring being axially forceable and radially deformable by respectively, axial and radial components of the pressurized fluid in said region to squeeze said first and second seal rings against, respectively, said first and second means, and to force said first and second surfaces against, respectively, said axial surface on said first means and said radial surface on said second means so as, thereby, to provide a seal against leakage of said fluid from said region through said zone.

2. Apparatus as in claim 1 in which said first means surrounds said second means and, in which, accordingly, said first seal ring and said first surface of said carrier ring are on the radially outer side of said carrier ring.

3. Apparatus comprising, first means providing a cylindrical wall extending around a central axis and enclosing at least part of a region occupiable by pressurized fluid; second means received in the cylindrical space enclosed by said wall to provide an end closure for an axial end of said region; there being between said two means an annular zone which has an entrance at said end to said region and is a zone of potential leakage of fluid from said region, and said second means having a surface presented towards said region and extending radially towards said zone entrance and wall; a closed annular resilient carrier ring disposed next to said surface to be axially between said entrance and a portion of said region and to be radially between said wall and a portion of said region; said ring having on its radially outward side a first surface registering with said wall; and said carrier ring having on its axial side towards said second means a second surface registering with said radial surface on said second means; a first closed annular resilient seal ring disposed on said radially outward side of said carrier ring to have said first surface interposed between said first seal ring and said zone entrance; and a second closed annular resilient seal ring disposed on said axial side of said carrier ring to have said second surface interposed between said seal second ring and said zone entrance: said carrier ring being axially forceable and radially expandable by respectively axial and radial components of the pressurized fluid in said region to squeeze said first and second seal rings against, respectively, said first and second means and to force said first and second surfaces against, respectively, said wall and said radial surface on said second means so as, thereby, to provide a seal against leakage of fluid from said region through said zone.

4. Apparatus as in claim 3 in which said second means is at least incrementally movable relative to said first means in at least the axial direction away from said region.

5. Apparatus as in claim 4 in which said first means circumferentially encloses by said cylindrical wall at least part of a pressure chamber for said fluid, and in which said second means is piston means axially movable relative to said first means in the space enclosed by said wall to render said chamber of variable volume.

References Cited by the Examiner

UNITED STATES PATENTS

| | | | |
|---|---|---|---|
| 1,548,948 | 8/1925 | Hirschfield | 277—223 |
| 2,614,793 | 10/1952 | Storm. | |
| 2,640,745 | 6/1953 | Wait | 277—5 |
| 2,666,659 | 1/1954 | Audemar | 277—103 |
| 2,722,402 | 11/1955 | Crookston | 251—324 |
| 2,828,170 | 3/1958 | Badgley | 92—259 X |
| 2,854,927 | 10/1958 | Berg | 277—16 X |
| 2,879,084 | 3/1959 | Staiger | 285—349 X |
| 2,927,831 | 3/1960 | Tuczek | 277—237 X |
| 3,094,335 | 6/1963 | Shenk | 277—5 |

LAVERNE D. GEIGER, *Primary Examiner.*

SAMUEL ROTHBERG, *Examiner.*

UNITED STATES PATENT OFFICE
CERTIFICATE OF CORRECTION

Patent No. 3,223,003            December 14, 1965

George Gerard et al.

It is hereby certified that error appears in the above numbered patent requiring correction and that the said Letters Patent should read as corrected below.

Column 1, line 51, for "exits" read -- exists --; column 4, line 19, for "pressurizzed" read -- pressurized --; column 8, line 32, for "radical" read -- radial --.

Signed and sealed this 18th day of October 1966.

(SEAL)
Attest:

ERNEST W. SWIDER
Attesting Officer

EDWARD J. BRENNER
Commissioner of Patents